United States Patent [19]

Edwards

[11] Patent Number: 5,123,380
[45] Date of Patent: Jun. 23, 1992

[54] BIRD FEEDER

[76] Inventor: Roger P. Edwards, 1901 Lafayette Ave., Greensboro, N.C. 27407

[21] Appl. No.: 736,764

[22] Filed: Jul. 29, 1991

[51] Int. Cl.⁵ .............................................. A01K 39/00
[52] U.S. Cl. .................................. 119/57.8; 119/52.2
[58] Field of Search ............... 119/52.2, 52.3, 57.8, 119/57.9

[56] References Cited

U.S. PATENT DOCUMENTS

| | | | |
|---|---|---|---|
| 1,102,004 | 6/1914 | Conboie | 119/52.2 |
| 4,201,155 | 5/1980 | Hyde | 119/57.8 |
| 4,646,686 | 3/1987 | Furlani | 119/57.9 |
| 4,690,101 | 9/1987 | Kilhan | 119/52.2 |

Primary Examiner—John G. Weiss
Attorney, Agent, or Firm—Rhodes, Coats & Bennett

[57] ABSTRACT

A bird feeder having a plurality of vertically spaced feed stations and a feed delivery system that, upon filling from the top, delivers a supply of feed to each feed station. The feed delivery system includes an inner supply tube or conduit arranged concentrically within an outer cylinder, which inner supply tube includes a plurality of vertically spaced delivery slots. As seed is supplied to the top of the outer cylinder, a substantial portion of the seed enters the inner supply tube and replenishes each feed station.

11 Claims, 1 Drawing Sheet

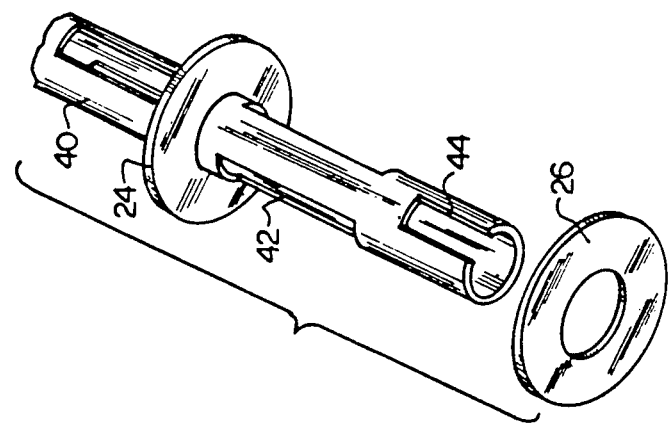
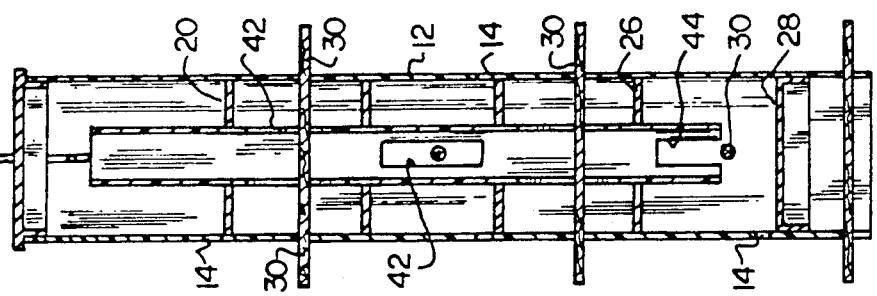
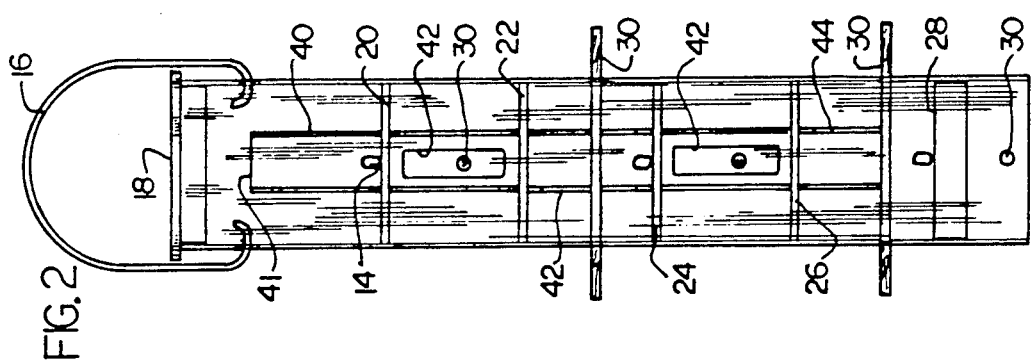
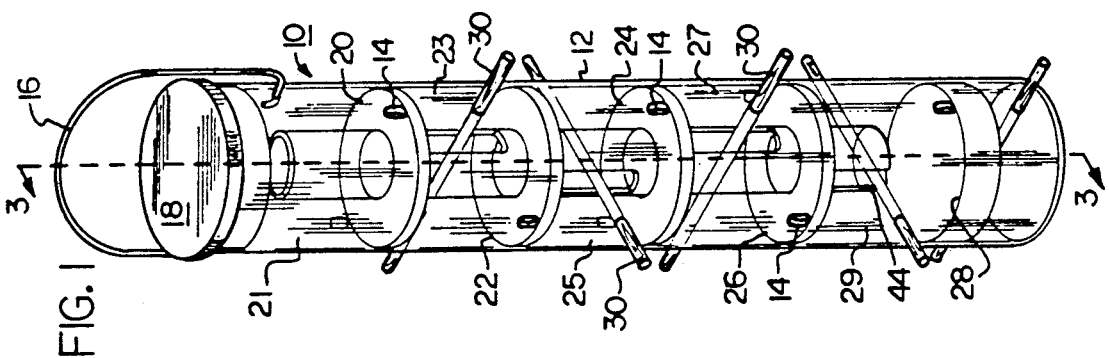

BIRD FEEDER

BACKGROUND OF THE INVENTION

This invention is directed to bird feeders and, more particularly, to a seed delivery system for replenishing a plurality of vertically spaced feeding stations in said bird feeder. While the invention is described with respect to a thistle feeder (for thistle seed), it is also intended for use with more conventional bird feeders with larger feed apertures.

During recent years, there have developed a number of types of bird feeders including many which supply feed apertures from a central supply of feed. Most of such bird feeders provide a central chamber which is filled, and a plurality of apertures in the side wall of said chamber through which birds can gain access to the feed therein.

A first type of bird feeder provides a plurality of apertures in the reservoir which contain the central supply of feed. However, the apertures are all located at or near the bottom of the feeder. Such a design limits the number of feeding apertures possible and, therefore, the number of birds which can feed at any one time.

Later designs have developed in which the bird feeders are provided with vertically, and usually peripherally spaced feeding apertures. One serious drawback with such bird feeders is that, as feed is depleted in the tubular housing, it quickly drops below the level of the upper feeding apertures. As a result, these apertures have no supply of feed and are therefore useless until the entire feed tube is refilled. Thus, the number of effective feeding apertures which may be utilized at any one particular time is limited, and the advantages which would have been offered by the multiple feeding stations is, for the most part, offset.

U.S. Pat. No. 4,201,155 to Hyde, Jr. is one attempt to address the aforedescribed problem. In the Hyde patent, there is provided a means for retaining a supply of feed at vertically spaced feeding stations which is, to some extent, independent of the level of the main supply in the housing. This is accomplished by providing a rectangular housing with a baffle member associated with each feed station. The baffle member retains a supply of feed for each station while allowing the remainder of the supply of feed to pass along to the feed stations thereunder. While the approach of Hyde partially addresses the problem, the problem is not fully solved, because the supply of feed retained at the upper feed stations is considerably less than that available at the lower feed station. Also, the Hyde concept appears to be compatible only with rectangular-shaped housings, while most of the suspended bird feeders today are formed of a cylindrical tube.

Another type feeder which has developed in recent years includes three large tubes which can dispense three different types of seed. Each tube includes an upper and lower chamber and a delivery tube for delivering some of the seed in the upper chamber to the lower chamber. While this approach is also somewhat successful, it is limited to two vertically spaced chambers.

SUMMARY OF THE INVENTION

In the present invention, there is provided a bird feeder which overcomes many of the problems described hereinabove. The feeder of the present invention includes a plurality of vertically spaced feeding stations. There is no limit to the number of feeding stations which can be supplied by the approach of the present invention. The feeder of the present invention includes a hollow cylindrical tube with a plurality of vertically spaced feed apertures. A platform is provided immediately beneath each feed aperture to form a feed station. A feed supply tube or conduit extends axially down through all of the platforms with the exception of the lowermost platform. The feed supply tube includes a plurality of vertically spaced delivery slots therein which provide an egress for seed which is supplied through the feed supply tube to the lower feed stations. So long as the level of seed remains above the upper end or inside of the feed supply tube, seed will continuously be delivered equally to all of the feed stations therebelow.

Successive ones of the delivery slots are spaced horizontally or peripherally around the feed supply tube. Perches may be provided on or through the walls of the cylindrical tube at appropriate positions for birds to receive feed from the feed opening thereabove. Since adjacent feed apertures are arranged transversely (or angularly) with respect to each other, the perches are also then peripherally spaced around the circumference of the cylindrical tube.

It is therefore an object of the present invention to provide an improved bird feeder.

It is another object of the present invention to provide a bird feeder of the type described in which a plurality of vertically spaced feed stations are maintained with a relatively equal supply of bird feed.

It is another object of the present invention to provide a bird feeder of the type described which is simple in design and extremely economical to manufacture.

Other objects and advantages will become apparent from reading the following detailed description of a preferred embodiment along with the accompanying drawings in which:

BRIEF DESCRIPTION OF THE DRAWINGS

FIG. 1 is a perspective view of the bird feeder according to the present invention;

FIG. 2 is a side view of the bird feeder illustrated in FIG. 1;

FIG. 3 is a sectional view taken substantially along lines 3—3 in FIG. 1; and

FIG. 4 is a perspective view of the hollow feed supply tube removed from the main cylinder.

DETAILED DESCRIPTION OF THE PREFERRED EMBODIMENT

Turning now to the drawings, and first to FIG. 1, there is illustrated the bird feeder 10 constructed in accordance with the present invention. A generally cylindrical housing 12 (sometimes "housing") is preferably formed of some suitable material such as clear acrylic. A plurality of feed access openings 14 are provided through the wall of housing 12 at vertically spaced positions therein. Adjacent levels of openings 14 are also spaced or staggered around the periphery of the housing 12 for reasons to be described hereinafter. A bail or handle 16 is suitably attached to the upper end of cylindrical housing 12 for both carrying the feeder and for suspending it from some suitable point. A cap 18 covers the cylindrical housing 12 during times when the feeder is in use, and is only removed for refilling purposes.

A plurality of feed support platforms 20,22,24,26, 28 are so positioned that one of the platforms will be disposed immediately beneath one (or an opposed pair) of the access openings 14 to provide a plurality of feed chambers 21,23,25,27,29. A perch 30 extends through housing 12 between diametrically opposed points in the wall thereof at a point appropriately spaced beneath each feed access opening 14.

As best illustrated in FIGS. 2 and 3, the hollow feed supply tube 40 (sometimes referred to as the "supply tube") is also formed of a clear acrylic material and has a cross-sectional dimension substantially less than that of the cylindrical housing 12. Supply tube 40 is slightly less in length than cylindrical housing 12 for reasons to be described hereinafter. The aforementioned platforms 20,22,24,26 are secured by suitable adhesive both to the outer circumference of the supply tube 40 and to the inner surface of the cylindrical housing 12 at appropriate positions. Alternatively, the platforms 20,22,24 and 26 are secured to the outer surface of supply tube 40 and the lower end of supply tube 40 rests on the perch 30 which extends through the lowermost feed station 29 to retain the supply tube in position within outer housing 12. So arranged, the platforms, supply tube 40 and outer cylindrical tube 12 form discreet feed chambers 21,23, 25,27,29. It is the continuous supply and maintenance of feed in this plurality of feed chambers which is the object of this invention.

A slot 42 is cut in diametrically opposed sides of inner feed supply conduit 40 in each of feed chambers 21,23,25,27,29. The slots 42 are preferably staggered at 90° angles, so that the perches 30, which extend therethrough, may be positioned at a 90° angle with respect to the perches immediately above and below. In addition to providing an egress for seed from the supply conduit 40 into the feed stations, the slots 42 provide for the insertion of perches 30 completely through the cylindrical housing 12, if desired. However, the perches can also merely be secured to the outer surface of housing 12 at appropriate locations according to conventional attachment techniques. In the lowermost feed chamber 29, as the feed conduit 40 is shortened, the slot 44 is also shortened. The feed conduit 40 may extend into the lowermost feed station 29 a sufficient distance so that the lower edge thereof rests on the perch 30 extending therethrough. Alternatively, if the periphery of the platforms 20,22,24,26 are adequately secured to the inner surface of the outer cylindrical housing 12, the lowermost portion of the feed conduit 40 which extends into the lowermost feed chamber 29 can be eliminated.

In use, assuming the feeder is empty, the cap 18 is removed and a supply of birdseed is introduced into the upper end thereof. The upper end 41 of supply tube 40 merely determines the level of seed which will be available in the upper feed chamber 21 because, as the seed is emptied into the housing 12, the excess seed in upper chamber 21 will begin to fill the conduit 40. Gravity will cause the majority of the seed to then fill the lowermost chamber 29 next. When lower chamber is filled, the seed will then exit through the slot 42 in the next lowest feed chamber 27. When feed chamber 27 is full, the seed will then fill feed chamber 25, and so forth, until all feed chambers and the housing 12 are full. Supply of seed is then stopped, and the cap replaced. The bird feeder is then suspended by bail 16 or otherwise mounted for operation.

As birds perch on perches 30 and acquire seed through the feed openings 14, the supply of seed in each feed compartment will begin to dwindle. However, since each feed compartment has its own floor (in the form of one of platforms 20-28) assuming the same amount of seed is removed from each compartment, each compartment will remain at substantially the same level throughout use. When all compartments become substantially empty, the cap is removed and the filling process is repeated. So long as the feed conduit 40 is full and/or seed remains above the upper level of feed conduit 40, the lower feed stations will continue to be replenished. Once the seed in feed conduit 40 has dropped below the level of the slot 42 in feed chamber 23, obviously no more will be replenished. Therefore, while the upper chambers will empty somewhat sooner than the others, the equalization of the feed supply is much improved over feeders known heretofor.

In alternate forms of the invention, the feed supply may be even further equalized several ways. One is to vary the distance of the lower edge of the slots 42 from the surface of the platform therebeneath in the different stages. Thus, if the lower edge of slot 42 is a greater distance from platform 20 in the next lower chamber 23, then the upper chamber will retain more feed when the supply has been exhausted, even though the next lower chamber will be replenished for a longer period of time. By this technique, the feed supply is even more equalized than in the illustrated embodiment. Another approach would be to make each feed station progressively larger in volume than the one immediately below so, that as the feed supply began to diminish in the feed supply tube 40, the upper stations would have a greater retained supply.

While the present invention is described with reference to a cylindrical housing 12, the concept is compatible with housings of other cross-sectional shapes, e.g., elliptical or rectangular.

While the invention has been described as being inclusive of the housing 12 and perches 30, it would be possible to commercialize the invention as a modification kit for existing tubular feeders. Toward this end, a feed supply tube 40 with platforms 22,24,26,28 secured thereto could be marketed as a conversion kit. Then, the purchaser could remove the top 18 of their existing feeder, remove perches 30 (if required), insert the conversion assembly replace the perches and top, and the conversion would be complete.

While a preferred embodiment of the invention has been described in detail hereinabove, it is apparent that various changes and modifications might be made without departing from the scope of the invention which is set forth in the accompanying claims.

What is claimed is:

1. A bird feeder comprising:
  a. a hollow cylinder having a first cross-sectional dimension and a plurality of vertically spaced feed access openings therein;
  b. a hollow feed supply tube having a second cross-sectional dimension less than said first cross-sectional dimension and being axially arranged within said hollow cylinder to de
  fine an annular space between the wall of said hollow cylinder and the wall of said feed supply tube;
  c. a plurality of vertically spaced delivery slots in said feed supply tube, there being a delivery slot disposed between at least some adjacent ones of said vertically spaced feed openings in said hollow cylinder;

d. a plurality of annular-shaped feed support platforms secured to said feed tube at vertically spaced points therealong, each of said platforms closely underlying of said vertically spaced feed accessable openings therein defining a plurality of discreet feed chambers, at least some of said platforms positioned on said supply tube at points between adjacent delivery slots, each feed chamber being replenished by birdseed from said feed supply tube which exits by gravity thereinto.

2. The bird feeder according to claim 1 wherein perches extend diametrically through said hollow feed supply tube and through the vertically spaced delivery slots in said feed supply tube at vertically spaced points therealong, the placement of said perches being such that each perch is disposed a prescribed distance below each of said vertically spaced feed openings in said hollow cylinder.

3. The bird feeder according to claim 1 wherein the upper level of said hollow feed supply tube is a prescribed distance below the upper level of said hollow cylinder.

4. The bird feeder according to claim 1 wherein each of said delivery slots has a lower edge which is spaced immediately beneath the corresponding perch extending therethrough, said lower edge serving to insure the maintenance of a minimum supply of seed in each of said feed chambers.

5. The bird feeder according to claim 4 wherein each of said slots in said delivery conduit includes an upper edge, which upper edge determines the maximum amount of birdseed which may be provided to said feed chamber during filling.

6. A bird feeder comprising a hollow cylinder having a plurality of vertically spaced feed access openings therein, means for positioning and maintaining said cylinder with its longitudinal axis extending vertically, said cylinder including a plurality of vertically spaced circular platforms forming discreet feed stations and an inner feed delivery means extending down through said platforms and the central portion of said hollow cylinder for replenishing each of said feed stations with a substantially equal supply of seed upon provision of a new supply seed at the upper end of said hollow cylinder.

7. A feed supply assembly for bird feeders of the type having a hollow cylinder with a first cross-sectional dimension and a plurality of vertically spaced feed access openings therein, said assembly comprising:

a. a hollow feed supply tube having a second cross-sectional dimension less than said first cross-sectional dimension and being axially arranged within said hollow cylinder to define an annular space between the wall of said hollow cylinder and the wall of said feed tube;

b. a plurality of vertically spaced delivery slots in said feed supply tube, there being a delivery slot disposed between at least some adjacent ones of said vertically spaced feed openings in said hollow cylinder;

c. a plurality of annular-shaped feed support platforms secured to said feed tube at vertically spaced points therealong, each of said platforms closely underlying one of said vertically space feed openings therein defining a plurality of discreet feed chambers, at least some of said platforms positioned on said supply tube at points between adjacent delivery slots, each feed chamber being replenished by birdseed from said feed tube which exits by gravity thereinto.

8. The bird feeder according to claim 7 wherein perches extend diametrically through said hollow feed supply tube and through the vertically spaced delivery slots in said feed supply tube at vertically spaced points therealong, the placement of said perches being such that each perch is disposed a prescribed distance below each of said vertically spaced feed openings in said hollow cylinder.

9. The bird feeder according to claim 7 wherein the upper level of said hollow feed supply tube is a prescribed distance below the upper level of said hollow cylinder.

10. The bird feeder according to claim 7 wherein each of said delivery slots has a lower edge which is spaced immediately beneath the corresponding perch extending therethrough, said lower edge serving to insure the maintenance of a minimum supply of seed in each of said feed chambers.

11. The bird feeder according to claim 10 wherein each of said slots in said delivery conduit includes an upper edge, which upper edge determines the maximum amount of birdseed which may be provided to said feed chamber during filling.

* * * * *